United States Patent
Yin et al.

(10) Patent No.: US 11,305,323 B2
(45) Date of Patent: Apr. 19, 2022

(54) WELDED PIPE MANUFACTURING APPARATUS AND WELDED PIPE MANUFACTURING METHOD

(71) Applicant: NAKATA MANUFACTURING CO., LTD., Osaka (JP)

(72) Inventors: Jilong Yin, Osaka (JP); Tomoyasu Nakano, Osaka (JP); Feizhou Wang, Osaka (JP); Takeyuki Sato, Osaka (JP)

(73) Assignee: NAKATA MANUFACTURING CO., LTD., Osaka (JP)

(*) Notice: Subject to any disclaimer, the term of this patent is extended or adjusted under 35 U.S.C. 154(b) by 302 days.

(21) Appl. No.: 16/461,766

(22) PCT Filed: Oct. 6, 2017

(86) PCT No.: PCT/JP2017/036450
§ 371 (c)(1),
(2) Date: May 16, 2019

(87) PCT Pub. No.: WO2018/092461
PCT Pub. Date: May 24, 2018

(65) Prior Publication Data
US 2019/0358690 A1    Nov. 28, 2019

(30) Foreign Application Priority Data

Nov. 21, 2016 (JP) .............................. JP2016-226259

(51) Int. Cl.
*B21C 37/08* (2006.01)
*B21D 5/12* (2006.01)
(Continued)

(52) U.S. Cl.
CPC ............... *B21C 37/08* (2013.01); *B21D 5/12* (2013.01); *B23K 37/053* (2013.01); *G01B 11/24* (2013.01); *G01N 21/88* (2013.01)

(58) Field of Classification Search
CPC . B21C 37/08; B21C 37/0822; B21C 37/0807; B21C 37/0826; B21C 37/06;
(Continued)

(56) References Cited

U.S. PATENT DOCUMENTS 6,828,523 B1 * 12/2004 Gysi .................... B23K 15/006
  219/121.13
6,909,799 B1 *  6/2005 Wildmann ........... B23K 26/044
  382/152

(Continued)

FOREIGN PATENT DOCUMENTS

CN           1140116 A    1/1997
CN         102791418 A   11/2012
(Continued)

OTHER PUBLICATIONS

JP-2005199293-A Machine Translation, 2005 (Year: 2005).*
(Continued)

*Primary Examiner* — Teresa M Ekiert
(74) *Attorney, Agent, or Firm* — Ladas & Parry LLP

(57) ABSTRACT

To manufacture a high-quality welded pipe, there is provided a welded pipe manufacturing apparatus for manufacturing a welded pipe by bending a metal plate and welding butting end portions of the metal plate. The welded pipe manufacturing apparatus includes a bending unit that bends the metal plate, a light emitter that emits directional light to an inner surface of the metal plate bent by the bending unit, an image capturing unit that captures light emitted by the light emitter and reflected by a surface of the metal plate, and an adjustment assistance unit that assists adjustment of the bending unit in accordance with a shape of the reflected light.

5 Claims, 18 Drawing Sheets

(51) Int. Cl.
*G01B 11/24* (2006.01)
*B23K 37/053* (2006.01)
*G01N 21/88* (2006.01)

(58) Field of Classification Search
CPC .. B21C 51/00; B21D 5/10; B21D 5/12; B21D 5/08; B21D 5/086; B21D 5/06; B21D 5/006; B21D 5/0281; B21D 5/14; G01B 11/24; B23K 9/0956; B23K 31/125; B29C 37/04
USPC .............................................................. 72/51
See application file for complete search history.

(56) References Cited

U.S. PATENT DOCUMENTS

| | | | |
|---|---|---|---|
| 10,065,234 B2 * | 9/2018 | Bolik | B21J 9/20 |
| 2005/0147289 A1 * | 7/2005 | Kodama | B21C 51/00 |
| | | | 382/152 |
| 2011/0100965 A1 * | 5/2011 | Yano | B23K 26/03 |
| | | | 219/121.64 |
| 2015/0146216 A1 | 5/2015 | Krauhausen et al. | |
| 2015/0343507 A1 * | 12/2015 | Deley, Jr. | B21C 37/0822 |
| | | | 219/61.3 |
| 2016/0350902 A1 * | 12/2016 | Hasegawa | G06T 7/001 |

FOREIGN PATENT DOCUMENTS

| | | |
|---|---|---|
| CN | 204183139 U | 3/2015 |
| JP | 8-193960 A | 7/1996 |
| JP | 2005-199293 A | 7/2005 |
| JP | 2005199293 A * | 7/2005 |
| JP | 2008-175577 A | 7/2008 |
| JP | 2011-642 A | 1/2011 |
| KR | 20160035085 A | 3/2016 |
| RU | 2 367 571 C2 | 6/2005 |
| RU | 2 466 021 C2 | 6/2008 |
| RU | 2367571 C2 | 9/2009 |
| RU | 2466021 C2 | 11/2012 |
| WO | 2009/157570 A1 | 12/2009 |
| WO | 2013/145307 A1 | 10/2013 |
| WO | WO 2013145307 A1 | 10/2013 |
| WO | 2015/037457 A1 | 3/2015 |

OTHER PUBLICATIONS

Russian Official Decision of Grant with an English translation dated Oct. 28, 2019 for Application No. RU 2019119214.
Espacenet English abstract of RU 2 466 021 C2.
Espacenet English abstract of RU 2 367 571 C2.
Chinese Office Action with an English (machine) translation dated Feb. 3, 2020 for Application No. CN 201780071603.2.
Extended European Search Report (EESR) dated Jun. 16, 2020 for Application No. EP 17871370.7.
Espacenet English abstract of CN 102791418 A.
Espacenet English abstract of CN 204183139 U.
Espacenet English abstract of CN 1140116 A.
Korean Office Action with an English (machine) translation dated Jul. 17, 2020 for Application No. KR 10-2019-7014799.
Espacenet English abstract of KR 20160035085.
International Search Report (ISR) and Written Opinion (WO) dated Oct. 31, 2017 for Application No. PCT/JP2017/036450.
Espacenet English abstract of JP 2005-199293 A.
Espacenet English abstract of JP 2008-175577 A.
Espacenet English abstract of JP 8-193960 A.
Espacenet English abstract of JP 2011-642 A.

* cited by examiner

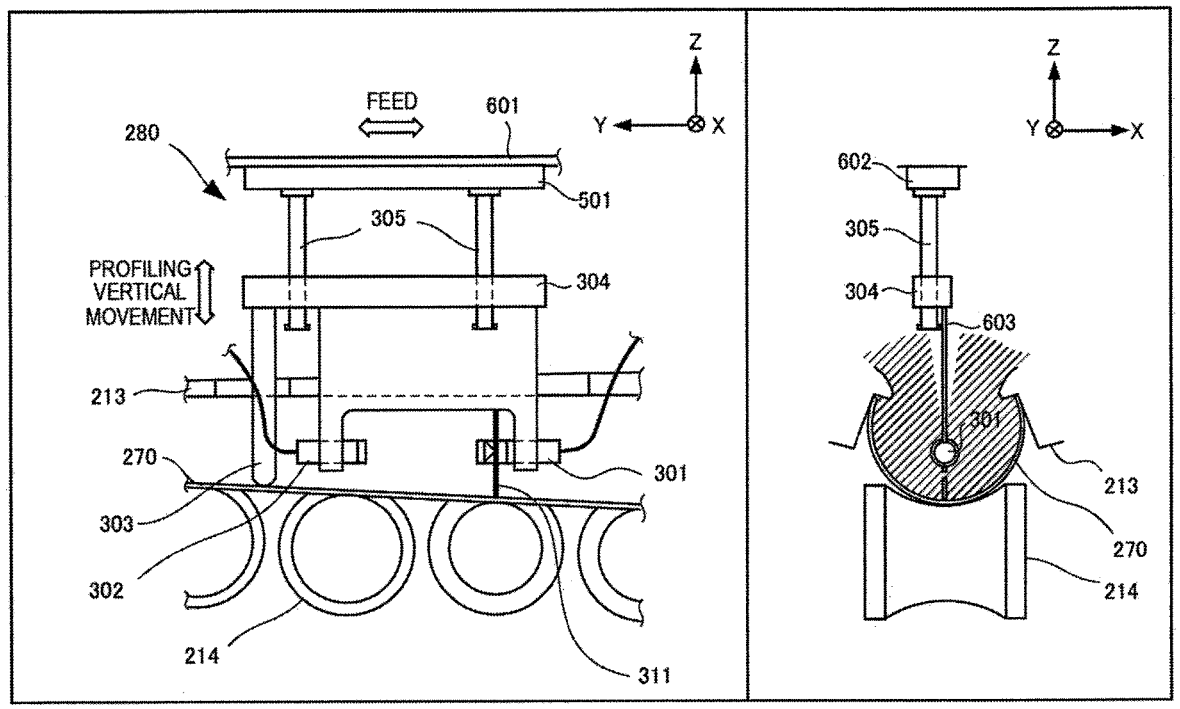
F I G. 6

WELDED PIPE MANUFACTURING APPARATUS AND WELDED PIPE MANUFACTURING METHOD

CROSS REFERENCE TO RELATED APPLICATIONS

This application is an application under 35 U.S.C. 371 of International Application No. PCT/JP2017/036450, filed on Oct. 6, 2017, which is based upon and claims the benefit of priority from Japanese patent application No. 2016-226259, filed on Nov. 21, 2016, the disclosure of each of which is incorporated herein in its entirety by reference.

TECHNICAL FIELD

The present invention relates to a welded pipe manufacturing apparatus and a welded pipe manufacturing method.

BACKGROUND ART

In the above technical field, patent literature 1 discloses a welded pipe manufacturing apparatus that bends upward the width-direction end portions of a metal strip by side rollers 13 and 14, shapes them by a fin pass roller 15, and performs butt welding of the two end portions by squeeze rollers 16. In a post-process of welding, this apparatus confirms the shape of a manufactured welded pipe by a combination of a laser parallel ray and a CCD camera. Based on the confirmed shape, the positions of the side rollers 13 and 14 and the squeeze rollers 16 are finely adjusted, thereby improving the butting property before welding.

CITATION LIST

Patent Literature

Patent literature 1: Japanese Patent Laid-Open No. 2005-199293

SUMMARY OF THE INVENTION

Technical Problem

In the technique described in the above literature, however, it is impossible to confirm the shape of a metal plate during forming since it is possible to detect only a shift of a butting portion after welding.

The present invention enables to provide a technique of solving the above-described problem.

Solution to Problem

One example aspect of the present invention provides a welded pipe manufacturing apparatus for manufacturing a welded pipe by bending a metal plate and welding butting end portions, comprising:

a bending unit that includes a pair of bending die arrays that continuously constrain the end portions of the metal plate and a roller group that abuts against a central portion of the metal plate and supports the central portion, and bends the metal plate;

a light emitter that emits directional light to an inner surface of the bent metal plate;

an image capturing unit that captures light emitted by the light emitter and reflected by the metal plate; and an adjustment assistance unit that assists at least one of position adjustment of the bending die arrays and position adjustment of the roller group in accordance with a shape of the reflected light.

Another example aspect of the present invention provides a welded pipe manufacturing method of manufacturing a welded pipe by bending a metal plate and welding butting end portions, comprising:

bending the metal plate by continuously constraining the end portions of the metal plate by a pair of bending die arrays and causing a roller group to abut against a central portion of the metal plate and support the central portion;

emitting directional light to an inner surface of the bent metal plate using a light emitter;

capturing light emitted by the light emitter and reflected by the metal plate; and assisting one or both of position adjustment of the bending die arrays and adjustment of the roller group in accordance with a shape of the reflected light.

Advantageous Effects of Invention

According to the present invention, it is possible to manufacture a more accurate welded pipe.

BRIEF DESCRIPTION OF DRAWINGS

FIG. 6 is a view showing the arrangement of the surface shape inspection unit according to the second example embodiment of the present invention;

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

A welded pipe manufacturing apparatus 100 according to the first example embodiment of the present invention will be described with reference to FIG. 1. The welded pipe manufacturing apparatus 100 is an apparatus that manufactures a welded pipe by bending a metal plate 110 and welding butting end portions 111 and 112.

Figure 1:
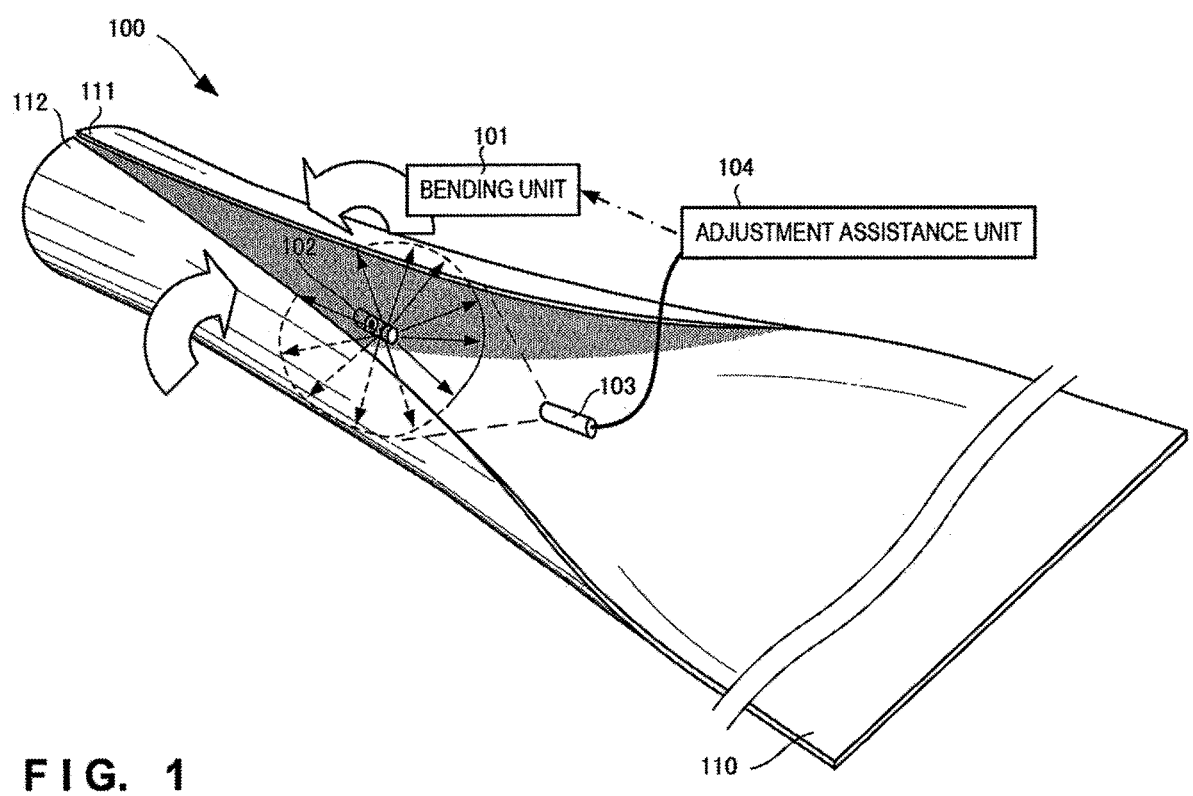
FIG. 1 is a view showing the arrangement of a welded pipe manufacturing apparatus according to the first example embodiment of the present invention.

As shown in FIG. 1, the welded pipe manufacturing apparatus 100 includes a bending unit 101, a light emitter 102, an image capturing unit 103, and an adjustment assistance unit 104.

The bending unit 101 bends the metal plate 110 by applying a force. The light emitter 102 emits light having directivity to the inner surface of the bent metal plate 110. The image capturing unit 103 captures light emitted from the light emitter 102 and reflected by the metal plate 110. The adjustment assistance unit 104 assists adjustment of the bending unit 101 in accordance with the shape of the reflected light.

With the above arrangement, it is possible to adjust the apparatus by observing a change in shape of the welded pipe during welded pipe manufacturing to find a defect of bending of the metal plate 110, thereby manufacturing a higher-quality welded pipe.

Second Example Embodiment

A welded pipe manufacturing apparatus 200 according to the second example embodiment of the present invention will be described next with reference to FIG. 2 and subsequent drawings.

Figure 2A:
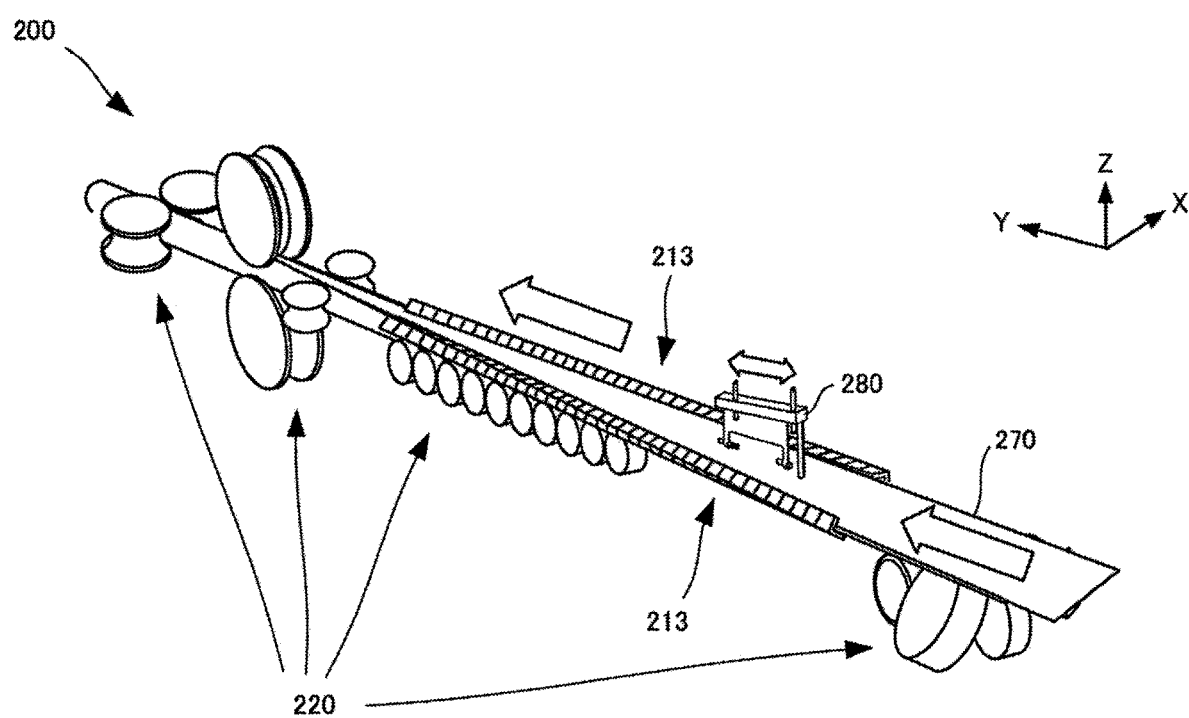
FIG. 2A is a view showing the schematic arrangement of a welded pipe manufacturing apparatus according to the second example embodiment of the present invention.

FIG. 2A is a view showing a schematic arrangement by extracting a characteristic portion of the welded pipe manufacturing apparatus 200. As shown in FIG. 2A, a flat plate-shaped metal plate 270 as a formed material is continuously constrained and bent using bending die arrays 213 and a roller group 220.

It is understood that the pair of opposing bending die arrays 213 has a low entrance resistance for moving in a direction indicated by an arrow at the same speed as that of the conveyed metal plate 270, and can suppress rolling completely, and thus the butting state of the edge portions is extremely satisfactory. A surface shape inspection unit 280 can move along the metal plate 270, and detect the degree of bending at each Y-direction position of the metal plate 270. As a result, it is possible to perform necessary adjustment of the apparatus very quickly.

Figure 2B:
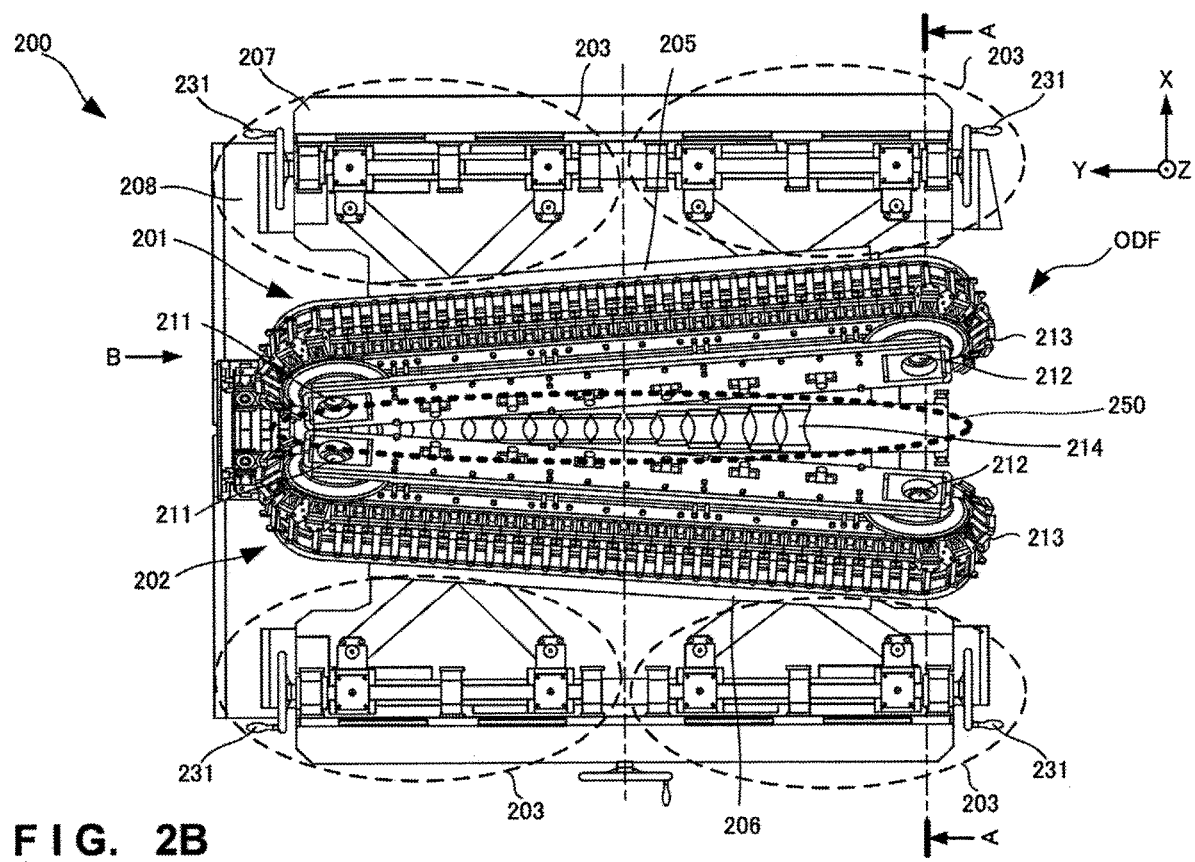
FIG. 2B is a view showing the detailed arrangement of the welded pipe manufacturing apparatus according to the second example embodiment of the present invention.

FIG. 2B is a plan view showing, in detail, the arrangement of the welded pipe manufacturing apparatus 200 according to this example embodiment. The welded pipe manufacturing apparatus 200 includes two continuous track units 201 and 202. Each of the continuous track units 201 and 202 includes a drive wheel 211, an idler wheel 212, and an oval belt surrounding the wheels. The oval belt includes a plurality of continuous bending die arrays 213. When the drive wheel 211 moves the belt, all the bending die arrays 213 turn on a continuous track.

When the bending die arrays 213 contact the two width-direction end portions of the long metal plate (not shown in FIG. 2B) as a formed material inserted from the right side in the Y direction in FIG. 2B, and apply a force to the two end portions while continuously changing a direction, the long metal plate is bent to form a metal pipe. When the bending die arrays 213 move in synchronism with the movement of the formed material, the two end portions and the bending die arrays 213 are in tight contact with each other while having a sufficient contact area, and no slippage occurs. Therefore, it is possible to stably form pipes from a very thin large-diameter pipe to a thick small pipe.

The continuous track units 201 and 202 are tilted in the X and Z directions and supported, and are configured to adjust tilting angles. The continuous track units 201 and 202 are placed on a bed 207 via tilting frames 205 and 206, and the bed 207 is supported to be movable vertically in the Z direction with respect to a base 208.

To control the Y-direction positions of the continuous track units 201 and 202, four link mechanisms 203 are provided in the bed 207, and can respectively adjust the Y-direction positions and tilts of the continuous track unit 201 and 202 using handles 231. The link mechanisms 203 arrange the continuous track units 201 and 202 so that the opposing interval in the X direction between the continuous track units 201 and 202 becomes smaller in the Y direction from the entrance side (the right side in FIG. 2B) to the exit side (the left side in FIG. 2B).

In this welded pipe manufacturing apparatus 200, a plurality of support roller arrays 214 that abut against the X-direction central portion of the bent metal plate to support it from below and define the lower bent surface are arrayed in the Y direction below a forming region 250 to which the metal plate is conveyed.

Figure 3:
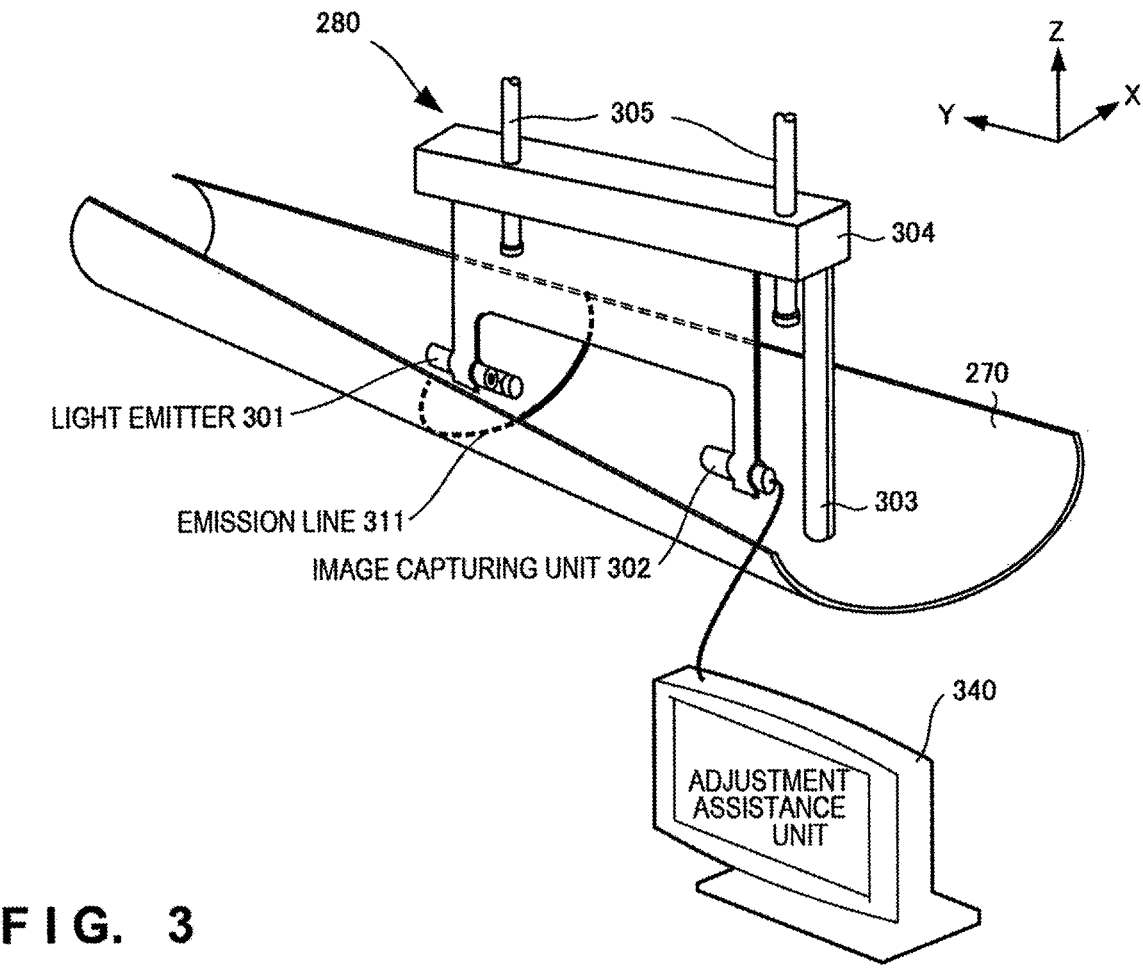
FIG. 3 is a view showing the arrangement of a surface shape inspection unit according to the second example embodiment of the present invention.

In this example embodiment, in the forming region 250, the surface shape inspection unit 280 is arranged to be movable in the Y direction, as shown in FIG. 3. The surface shape inspection unit 280 includes a light emitter 301 that draws a line 311 by emitting light having directivity to the inner surface of the bent metal plate 270, and an image capturing unit 302 that captures the drawn line 311. The surface shape inspection unit 280 further includes an abutting member 303 that abuts against the lowermost surface of the inner surface of the metal plate 270, and a supporter 304 that suspends and supports the light emitter 301, the image capturing unit 302, and the abutting member 303. The supporter 304 can vertically slide along two vertical shafts 305. As a result, even if the metal plate 270 is bent more, the abutting member 303 always abuts against the inner surface of the metal plate 270. If the supporter 304 that supports the light emitter 301 and the image capturing unit 302 is slid in the Y direction, the supporter 304 slides in the Y and Z directions while keeping a constant distance from the lowermost surface of the inner surface of the metal plate 270, thereby detecting the shape of the inner surface of the metal plate 270. The distance from the lowermost surface of the inner surface of the metal plate 270 at this time needs to be changed in accordance with the dimensions of the product welded pipe. That is, the abutting member 303 having a length according to the inner diameter of a welded pipe to be manufactured is used.

An adjustment assistance unit 340 assists adjustment of the support roller arrays 214 serving as a bending unit in accordance with the shape of the line 311 (reflected light).

Figure 4:
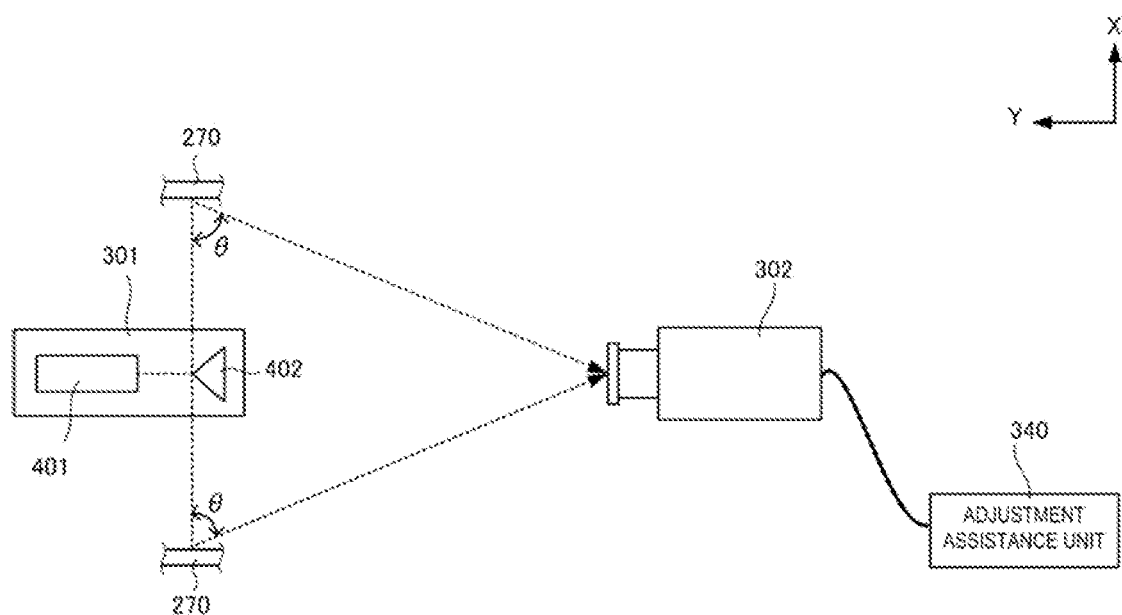
FIG. 4 is a view showing the arrangement of the surface shape inspection unit according to the second example embodiment of the present invention.

FIG. 4 is a view showing the optical relationship between the light emitter 301 and the image capturing unit 302. Light emitted from a laser oscillator 401 included in the light emitter 301 is reflected by a conical mirror 402, and the entire bent inner surface of the metal plate 270 is irradiated with the reflected light as a ring laser beam, thereby drawing the line 311. For example, the image capturing unit 302 such as an image sensor captures the shape of the line 311. The adjustment assistance unit 340 may display the captured line 311 intact on a monitor, or superimpose and display the captured line 311 on a designed inner surface shape to present the difference between them or dimensions which are need to be adjusted.

Figure 5:
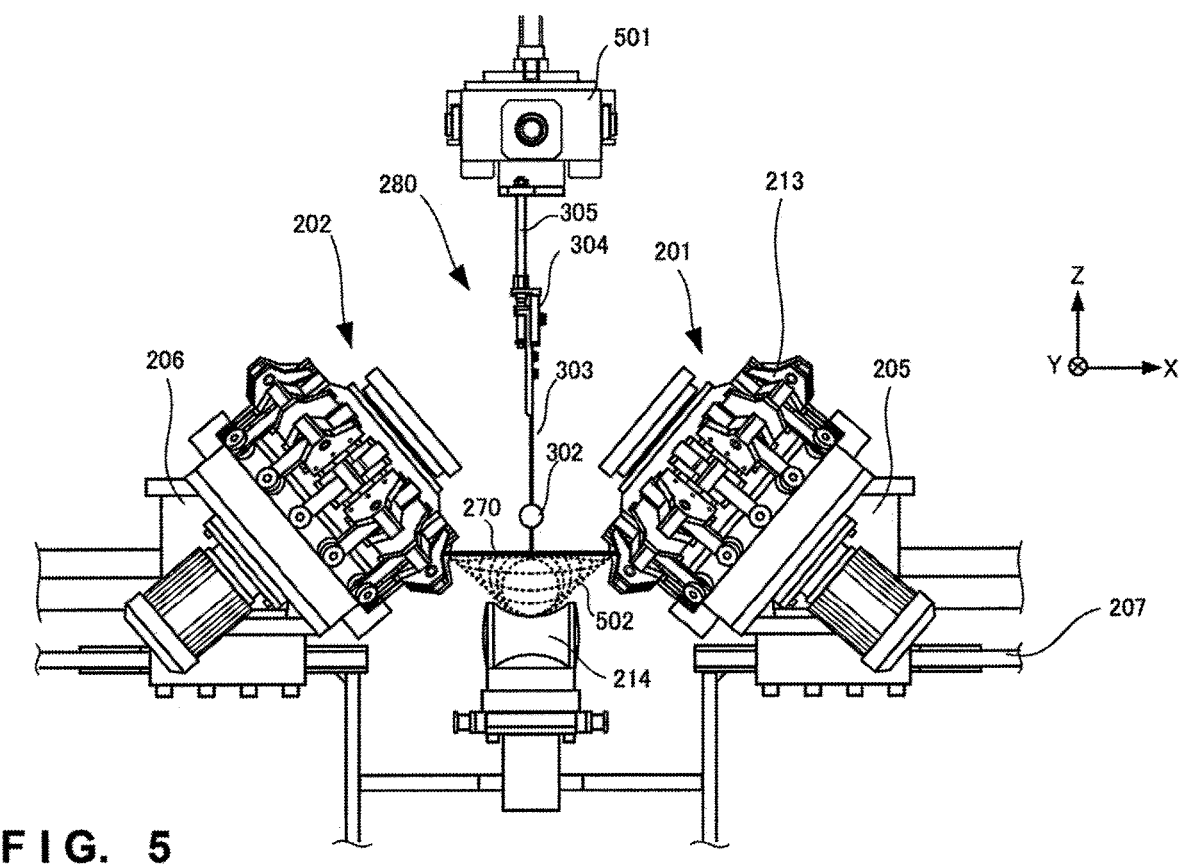
FIG. 5 is a view showing the arrangement of the surface shape inspection unit according to the second example embodiment of the present invention.

FIG. 5 is a view showing an end face taken along a line A-A when viewing the continuous track units 201 and 202 and the surface shape inspection unit 280 from the Y-direction entrance side. For easy understanding, FIG. 5 shows only a main part by omitting the arrangement on the exit side.

As shown in FIG. 5, the continuous track units 201 and 202 are arranged at the same height by a vertical moving mechanism so that the opposing bending die arrays 213 are horizontal. When viewed from the Y direction, however, the continuous track units 201 and 202 are tilted and arranged to have a V-shaped section.

The metal plate 270 is held and deformed between the bending die arrays 213 of the thus arranged continuous track units 201 and 202. Broken lines 502 indicate a roller flower representing the process of deformation of the metal plate.

The surface shape inspection unit 280 is arranged at the center between the continuous track units 201 and 202, and is slid in the Y direction by a driver 501. Thus, it is possible to capture, at any time, the inner surface shape of the metal plate 270, which is gradually deformed from front to back in FIG. 5.

Furthermore, by using the surface shape inspection unit 280 in a state in which there is no metal plate 270, the actual surface shape of the support roller array 214 can be acquired as image data. By comparing the degree of deformation of the metal plate 270 and the surface shape of the support roller array 214 with each other, it is possible to reconsider the arrangement of the support roller array 214 in the Y and Z directions and the shape of a support roller itself.

FIG. 6 is a view showing the detailed arrangement of the surface shape inspection unit 280. The surface shape inspection unit 280 slides along a rail 601 provided above the support roller array 214. At this time, when the abutting member 303 abuts against the lowermost surface of the inner surface of the metal plate 270, the supporter 304 moves vertically. Along with this, the light emitter 301 and the image capturing unit 302 also move vertically. That is, if the surface shape inspection unit 280 is slid in the Y direction, the surface shape inspection unit 280 slides in the Y and Z directions while keeping a constant distance from the lowermost surface of the inner surface of the metal plate 270, thereby detecting the shape of the inner surface of the metal plate 270. A hatched portion in the right view indicates a light irradiation range.

Figure 7:
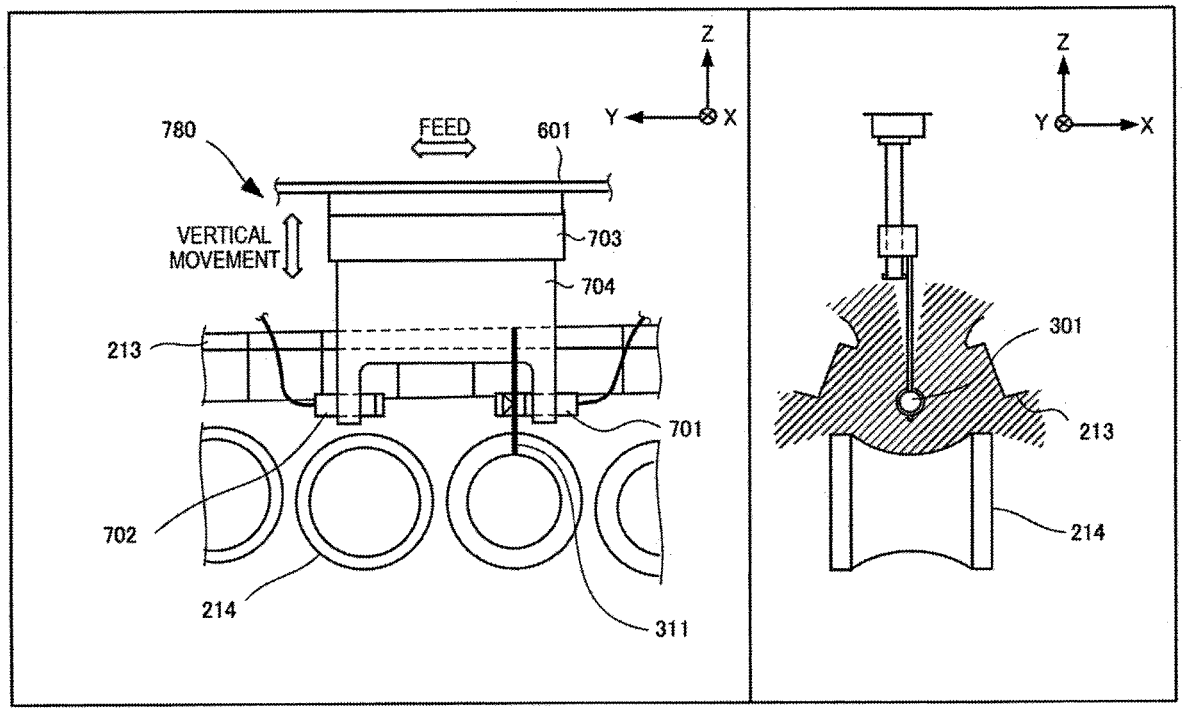
FIG. 7 is a view showing the arrangement of the surface shape inspection unit according to the second example embodiment of the present invention.
Figure 8:
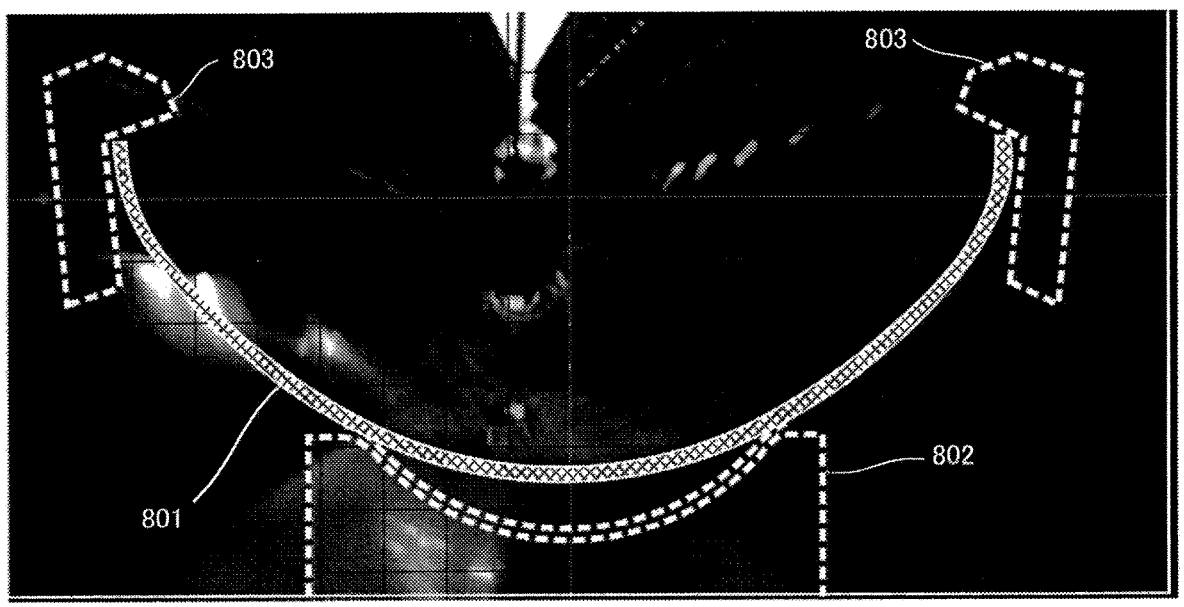
FIG. 8 is a view showing an example of the display screen of an adjustment assistance unit according to the second example embodiment of the present invention.
Figure 9:
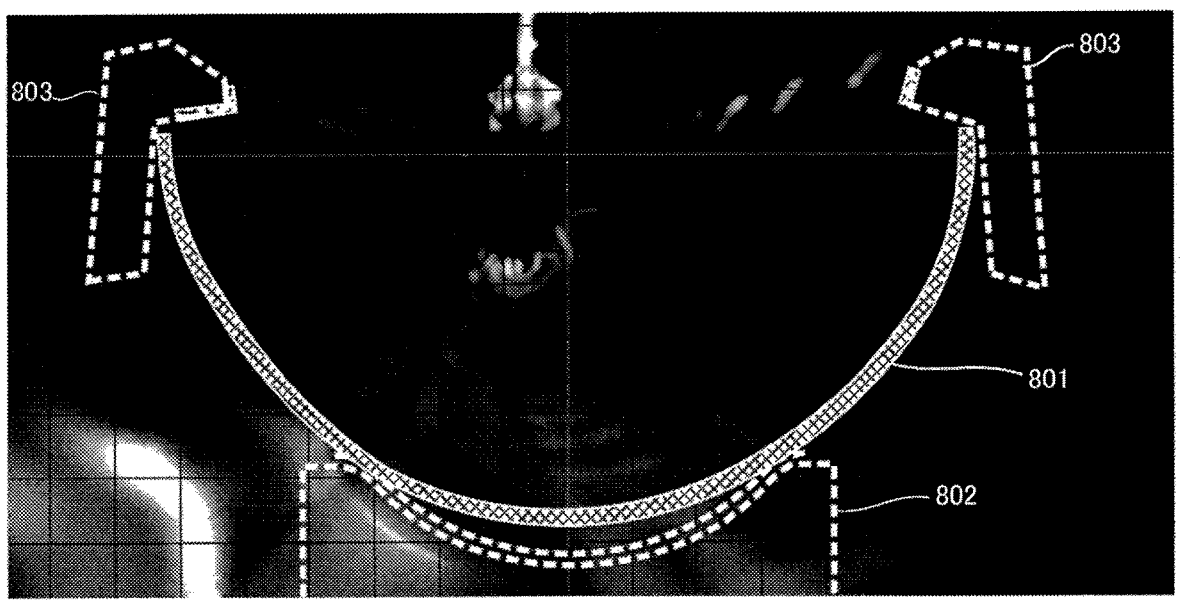
FIG. 9 is a view showing another example of the display screen of the adjustment assistance unit according to the second example embodiment of the present invention.
Figure 10:
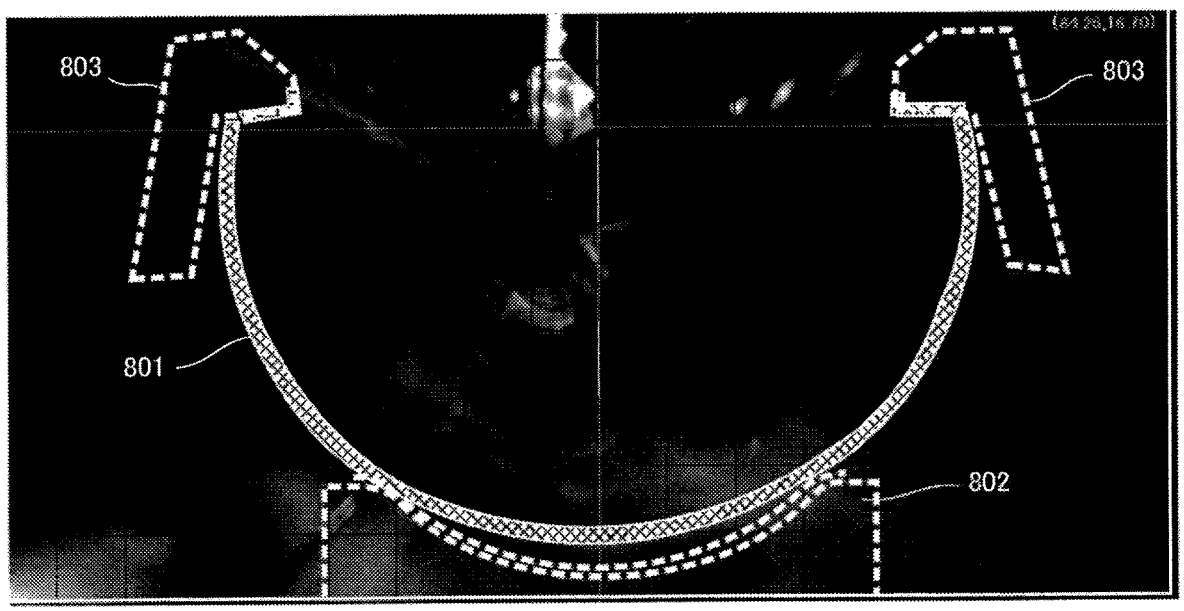
FIG. 10 is a view showing still other example of the display screen of the adjustment assistance unit according to the second example embodiment of the present invention.
Figure 11:
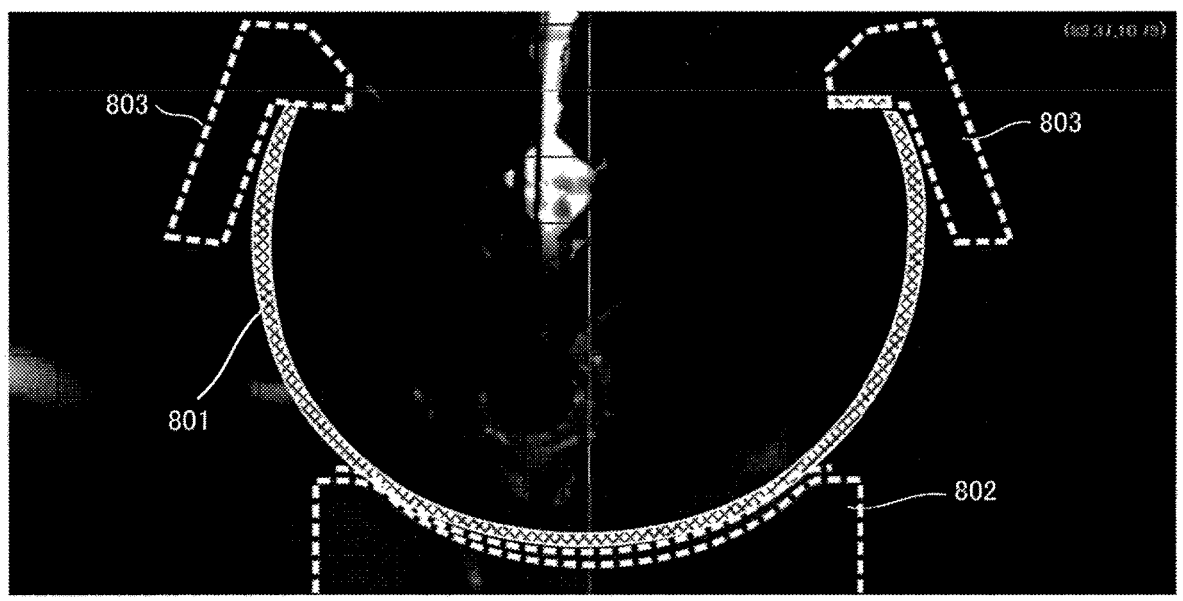
FIG. 11 is a view showing still other example of the display screen of the adjustment assistance unit according to the second example embodiment of the present invention.
Figure 12:
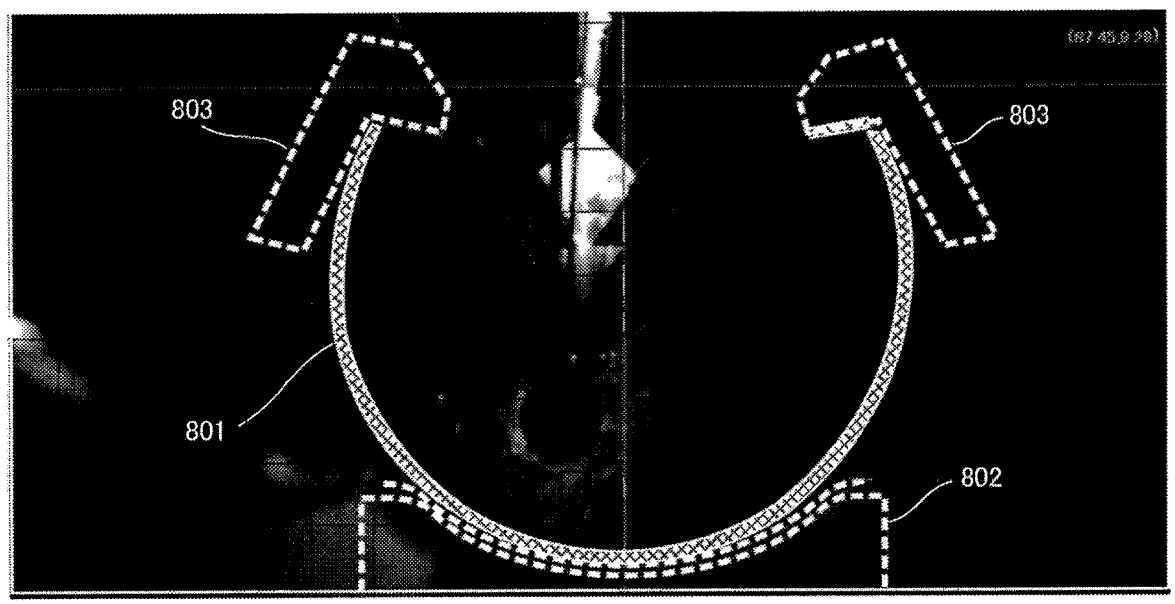
FIG. 12 is a view showing still other example of the display screen of the adjustment assistance unit according to the second example embodiment of the present invention.
Figure 13:
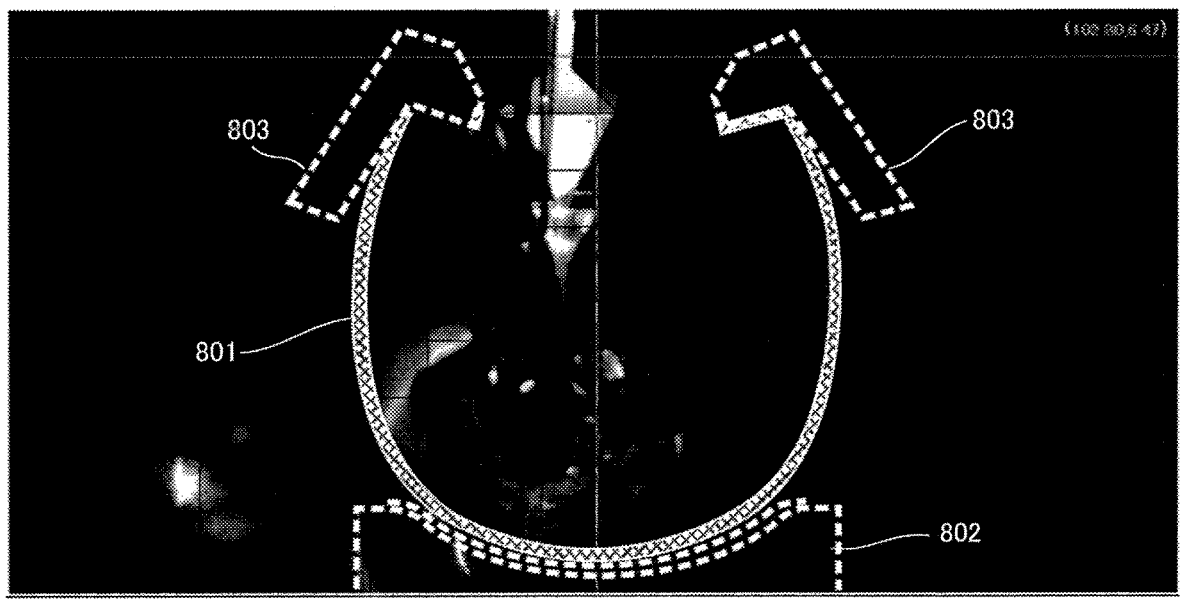
FIG. 13 is a view showing still other example of the display screen of the adjustment assistance unit according to the second example embodiment of the present invention.
Figure 14:
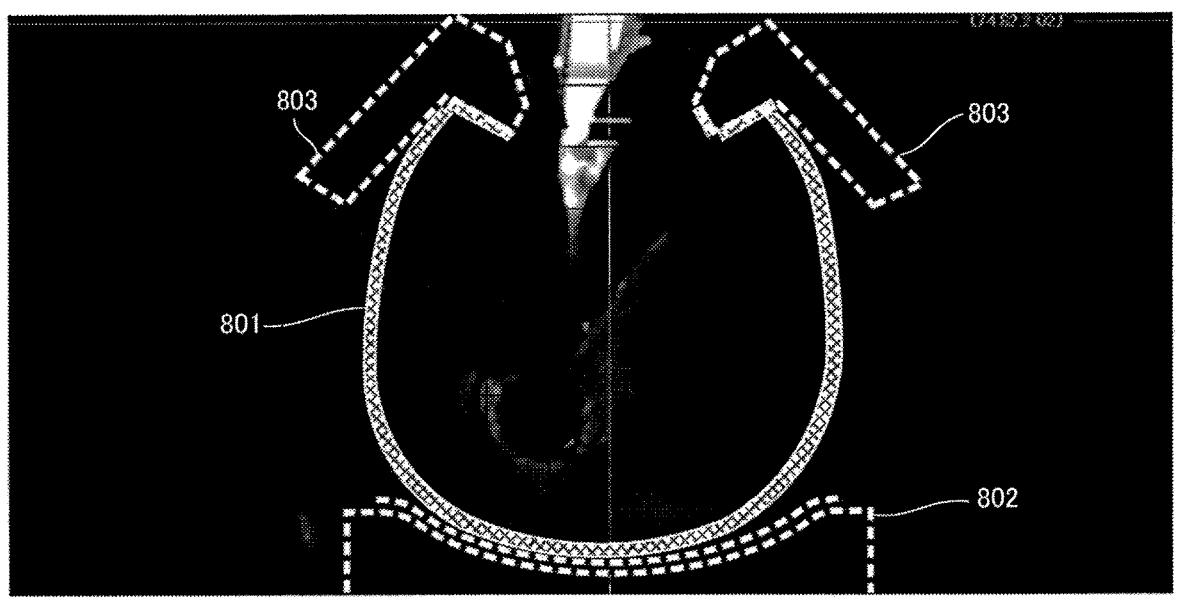
FIG. 14 is a view showing still other example of the display screen of the adjustment assistance unit according to the second example embodiment of the present invention.
Figure 15:
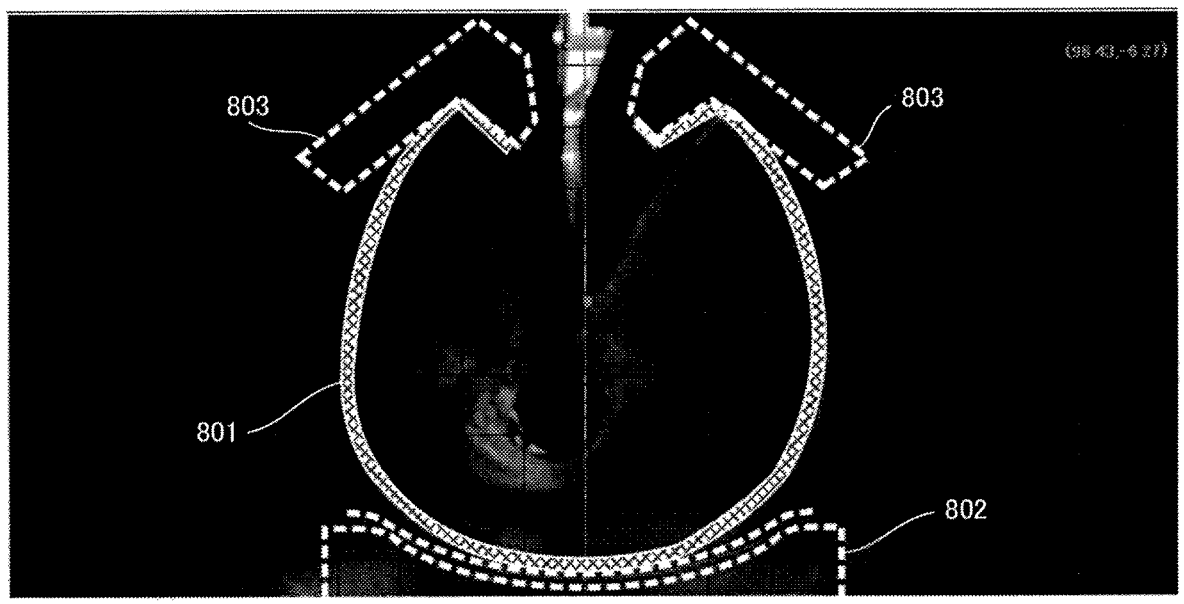
FIG. 15 is a view showing still other example of the display screen of the adjustment assistance unit according to the second example embodiment of the present invention.
Figure 16:
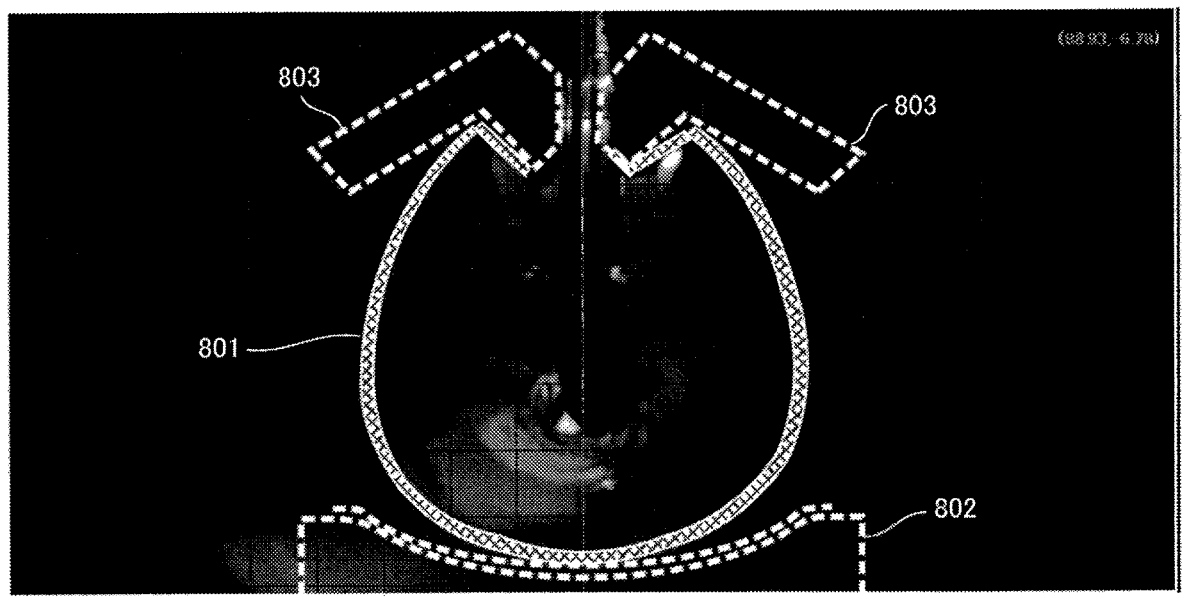
FIG. 16 is a view showing still other example of the display screen of the adjustment assistance unit according to the second example embodiment of the present invention.

FIG. 7 is a view for explaining a surface shape inspection unit 780 that inspects the surface shape of the support roller array 214. The surface shape inspection unit 780 slides along the rail 601 provided above the support roller array 214, similar to the surface shape inspection unit 280 shown in FIG. 6, but includes no abutting member 303. A supporter 704 moves vertically by a vertical moving unit 703. Along with this, a light emitter 701 and an image capturing unit 702 also move vertically. Light emitted from the light emitter 701 is reflected by the upper surface of the support roller array 214, and the image capturing unit 702 captures the reflected light, thereby detecting the position and shape of the support roller array 214. A hatched portion in the right view indicates a light irradiation range.

FIGS. 8 to 16 each show a display screen in the adjustment assistance unit 340 when the above-described surface shape inspection unit 280 or 780 is used. As the surface shape inspection unit 280 moves in the Y direction, the display screen changes from FIG. 8 to FIG. 16 in accordance with a forming stage.

With these images, it is possible to compare a captured image 801 of the line 311 formed by irradiation with the ring laser beam, a captured image 802 of the surface shape of the support roller array 214, and drawn images 803 indicating the designed positions of the bending die arrays 213. This makes it possible to confirm the degree of deformation of the metal plate 270, and decide the adjustment dimensions of the support roller array 214 and the like.

The adjustment assistance unit 340 may display the designed shape of the inner surface of the metal plate 270 together with the shape of the reflected light.

With the above arrangement, it is possible to adjust the apparatus by finding a defect of bending of the metal plate 110 during welded pipe manufacturing, thereby manufacturing a more accurate welded pipe. Note that if the surface of the support roller array 214 is glossy, the ring laser beam is reflected totally (diffused light decreases), posing a problem that it becomes difficult for the image capturing unit 702 to capture reflected light. To solve this problem, surface processing may be performed for the support roller array 214 to lose the gloss of the surface, thereby making it easy to capture reflected light. For example, nitriding may be performed for the support roller to be black, or the surface may simply be colored.

Third Example Embodiment

A welded pipe manufacturing apparatus according to the third example embodiment of the present invention will be described next with reference to FIG. 17.

An aluminum material, copper material, and stainless steel material used as materials of a welded pipe include a material having a glossy surface. If a material having a glossy surface is used, even if this material is irradiated with a laser beam, a state close to a total reflection state is unwantedly obtained. That is, the range of a diffuse reflection angle (critical angle) narrows. To cope with this, in this example embodiment, as shown in FIG. 17, an image capturing unit 302 is arranged in the range of the critical angle in accordance with the glossiness of the material.

On the other hand, strong gloss of the surface poses a problem that noise components such as multiple reflected light beams caused by regular reflected light components increase.

Figure 17:
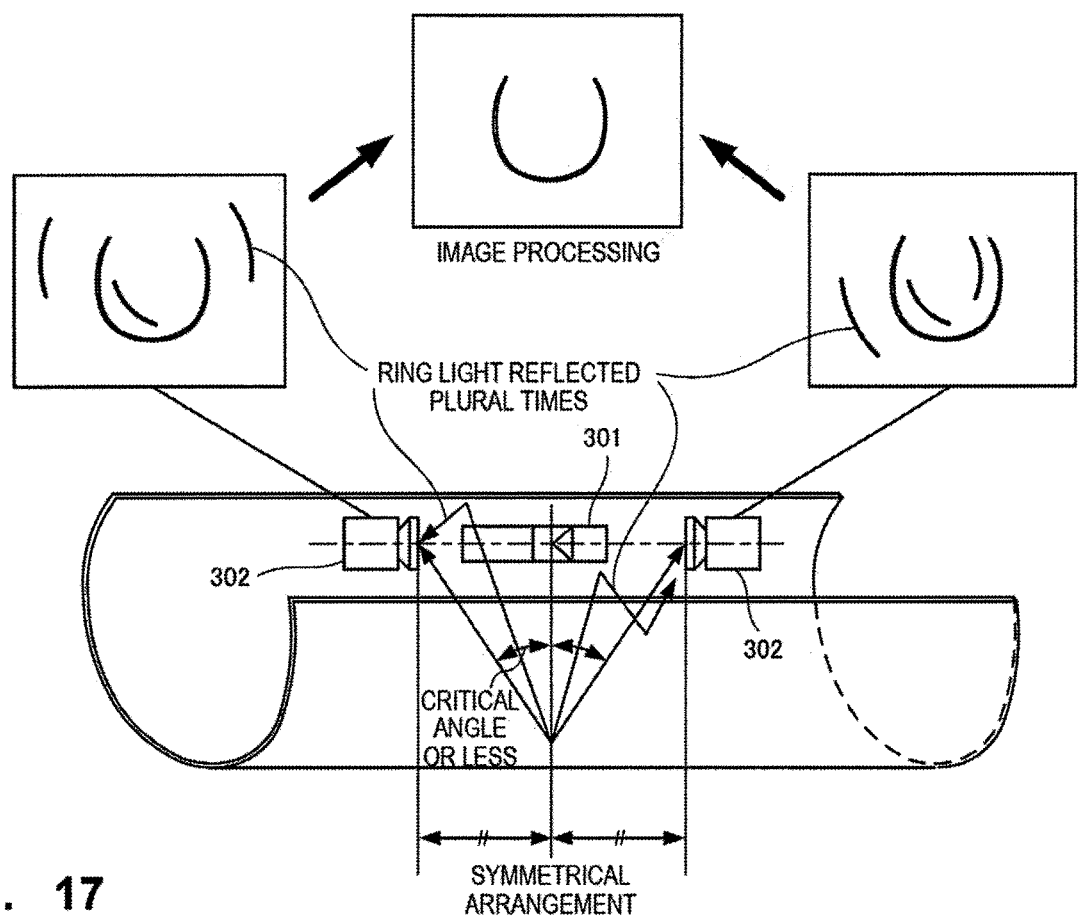
FIG. 17 is a view showing the arrangement of a surface shape inspection unit according to the third example embodiment of the present invention.

To solve this problem, in this example embodiment, as shown in FIG. 17, one image capturing unit 302 is arranged at each of the symmetrical positions in the Y-axis direction sandwiching a plane on which the ring laser beam is diffused, that is, on each of the upstream and downstream sides, and captures one of reflected light beams in the symmetrical directions on the Y-axis from an emission line 311. Two captured data obtained by the pair of image capturing units 302 undergo image processing, for example, difference processing to remove multiple reflected light components (noise), thereby obtaining the surface shape from the emission line 311.

Note that it is possible to improve shape detection accuracy by adopting slit light of an LED, which includes no spectral noise and is hardly reflected irregularly. Furthermore, for example, it is possible to adopt an optical system that changes the arrangement of the image capturing units 302 in accordance with the presence/absence of gloss of a measured material, or changes the focal length of a lens from the tele-photo side to the wide angle side.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The invention claimed is:

1. A welded pipe manufacturing apparatus for manufacturing a welded pipe by bending a metal plate and welding butting end portions, comprising:
   a bending unit that includes a pair of bending die arrays that continuously constrain the end portions of the metal plate and a roller group that abuts against a central portion of the metal plate and supports the central portion, and bends the metal plate;
   a light emitter that emits directional light to an inner surface of the bent metal plate;
   an image capturing unit that captures light emitted by said light emitter and reflected by the metal plate; and
   an adjustment assistance unit that assists at least one of position adjustment of the bending die arrays and position adjustment of the roller group in accordance with a shape of the reflected light;
   wherein the roller group includes a support roller that supports the metal plate from below;
   wherein the directional light is emitted to a surface of said support roller using said light emitter, and said image capturing unit captures the light emitted from said light emitter and reflected by the surface of said support roller, and
   wherein said adjustment assistance unit assists adjustment of said bending unit based on the shape of the light reflected by the metal plate and the shape of the light reflected by the surface of said support roller.

2. The welded pipe manufacturing apparatus according to claim 1, wherein said adjustment assistance unit includes a display unit that displays the shape of the reflected light.

3. The welded pipe manufacturing apparatus according to claim 2, wherein said display unit displays a designed shape of the inner surface of the metal plate together with the shape of the reflected light.

4. The welded pipe manufacturing apparatus according to claim 1, wherein
   said adjustment assistance unit assists position adjustment of said support roller in a vertical direction.

5. A method of bending a metal plate into a desired pipe shape wherein end portions of the metal plate abut one another to enable welding of the abutting end portions, the method comprising:
   providing the welded pipe manufacturing apparatus according to claim 1;
   bending the metal plate by continuously constraining the end portions of the metal plate with the pair of bending die arrays and causing the roller group, including the support roller, to abut against a central portion of the metal plate and support the central portion;
   wherein, during the bending, a position of the bending die arrays, roller group or both is adjusted to achieve the desired pipe shape by the steps of:
   emitting directional light to the surface of the support roller using the light emitter such that the image capturing unit captures the light emitted from the light emitter and reflected by the surface of the support roller;
   capturing light emitted by the light emitter and reflected by the support roller; and
   assisting one or both of position adjustment of the bending die arrays and adjustment of the roller group in accordance with a shape of the reflected light.

* * * * *